United States Patent Office 3,192,725
Patented July 6, 1965

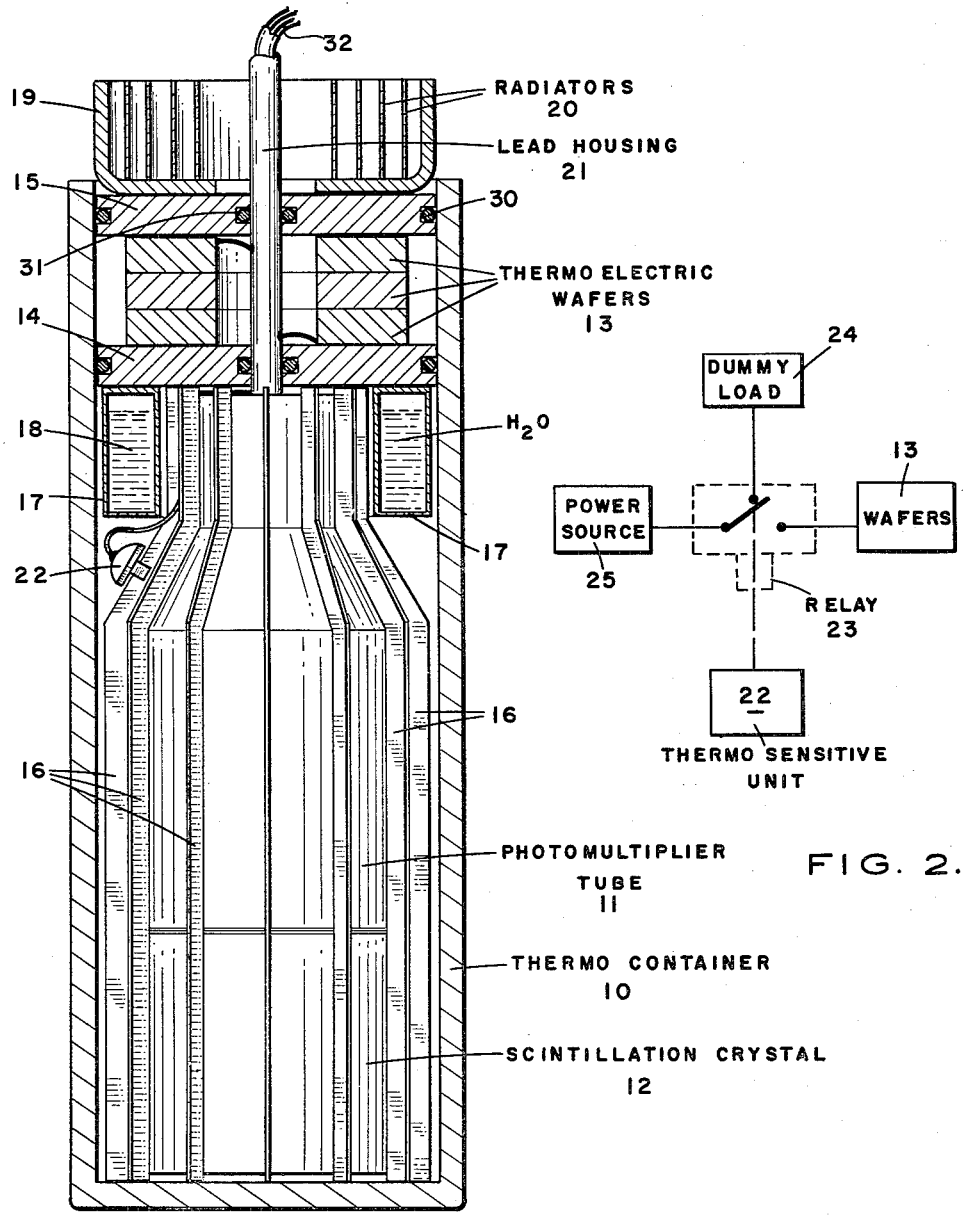

3,192,725
TEMPERATURE STABILIZED RADIATION DETECTORS
Donald H. Britton, Wilmer A. Hoyer, and Robert C. Rumble, Houston, Tex., assignors, by mesne assignments, to Esso Production Research Company, Houston, Tex., a corporation of Delaware
Filed Nov. 29, 1962, Ser. No. 240,901
5 Claims. (Cl. 62—3)

This invention relates to method and apparatus for maintaining radiation detectors at low, constant temperatures. More particularly, it relates to cooling and maintaining at low temperatures radiation detectors by thermoelectric means.

The necessity for protecting radiation detectors from elevated and constantly changing temperatures such as those encountered when making a well survey is well recognized. Temperatures experienced by a logging sonde in a well bore are frequently sufficiently high to cause permanent damage to an unprotected detector. Also, in general, within the operable range of a scintillation type detector, changes of temperature have an adverse effect upon over-all gain.

A constant temperature must be maintained for a scintillation detector when it is used to obtain accurate information as to the amplitudes of scintillation pulses representative of energy levels of radioactive particles or photons impinging on the scintillation material of the detector.

In some applications in which temperature stability is not maintained, elaborate means are required to monitor the detector gain almost continuously during logging of the well, so that appropriate corrections may be applied to the observed data. Even then, in such systems, it is difficult to compensate for the deterioration in the signal-to-noise ratio at elevated temperatures.

The detector unit may be held at constant, low temperatures by mounting it in a refrigerated, thermally insulated container. Known devices of this type refrigerate the detector unit by surrounding it with ice or other heat absorbing, meltable substances immediately prior to the start of the well survey in order to obtain a maximum length of operating time in the borehole before the ice melts. The present invention overcomes difficulties and deficiencies apparent in cooling detectors in this manner.

Thus, a primary object of the present invention is to provide an improved method and apparatus for maintaining a low, substantially constant temperature during surveys of the well bore of a detector.

In brief, the present invention resides in refrigerating the detector by means of thermoelectric cooling. The basic elements, of which the invention is composed, include a thermally insulated or Dewar type container for holding the detector unit; thermoelectric cooling means arranged in the container near the detector unit; and temperature control means for supplying and terminating the supply of electrical energy to the thermoelectric cooling means when the temperature within the container rises above and falls below, respectively, a specified level.

Important advantages achieved through this invention are: the detector unit can be maintained at a constant, preselected low temperature for any desired time interval; as desired, the cooling process can be continuous and automatic, or intermittent; tubing coils, ice, and other special refrigeration equipment are not needed; and the time required for preparation of the instrument for the survey is shortened since the refrigeration can be carried out while the instrument is being lowered into the borehole.

Refrigeration utilizing the Peltier effect or thermoelectric cooling is particularly useful for cooling objects by the direct conversion of electrical into thermal energy. Representative characteristics and performance data for thermoelectric cooling devices can be found in Westinghouse Bulletin No. 54–763. Examples of typical thermoelectric coolers are: Model 094,447, Borg-Warner Corp., Bedford, Ohio; Model TA–20, Thermal Module, Ohio Semiconductors, Columbus, Ohio; Model STM–1025, Thermo Module, Sanyo Electric Inc., Ellenville, New York; and Cooler Model 10, Minnesota Mining and Manufacturing Co., St. Paul, Minnesota. Devices of this type have features which make them particularly attractive for use in well logging instruments. These features are: small size, temperature differences maintained between hot and cold surfaces are high enough to make these units practical even at the elevated temperatures encountered in well bores; efficiency (about 20%) is high enought to cool low heat generating devices such as photomultipliers in thermally insulated containers; and control of the electrical energy into these units permits regulation of the temperature maintained in the refrigerated compartment.

The above and other objects and advantages of the invention will be apparent from a more detailed description thereof when taken with the drawings wherein:

FIG. 1 is a vertical, partly sectional view of the detector unit and thermoelectric cooling means arranged in an enclosure in accordance with the invention; and FIG. 2 is a simplified block diagram of the system used to regulate the refrigeration.

Referring to the drawings in greater detail, in FIG. 1, a photomultiplier tube 11 and scintillation crystal 12 are shown combined in an integrated unit located in a thermally insulated container 10 such as a Dewar flask. Thermoelectric converters in the form of wafers 13 arranged in the opening of container 10 function to refrigerate the detector unit and together with cold and hot end plates 14 and 15, respectively, also serve as a holder for the detector unit and as an insulated stopper for the container. End plates 14 and 15 are sealed to the interior wall of container 10 by seals 30 and to a central tubular housing 21, which carries electrical leads 32 into the interior of container 10, by seals 31. These end plates are fabricated from good thermal conductor substances such as copper or aluminum to equalize temperatures on the hot and cold junctions of thermoelectric converters 13.

The maximum temperature differential desired between the well environment and the detector unit determines the number of layers of thermoelectric wafers required.

A series of circumferentially spaced apart fins 16, also formed of good (copper or aluminum) thermal conducting material, are arranged about photomultiplier tube 11 and crystal 12 to conduct heat from them into cold plate 14. The fins may be omitted if alternatively the detector unit is housed in a good thermal conductor.

Electrical leads designated 32 not only supply voltage to operate photomultiplier 11 and carry photomultiplier signals from the photomultiplier, but they also form part of an electrical circuit which operates to automatically regulate the temperature within container 10. A thermostat 22 clipped to one of the fins 16 and the other components of this temperature control system are shown in the block diagram of FIG. 2.

Temperature sensitive control device 22 which may utilize a temperature operable bimetallic strip or fluid filled bellows acts through a relay 23 to cause electrical energy from power source 25 to feed to thermoelectric wafers 13 when the temperature within container 10 rises above a predetermined level to cool plate 14 and lower the temperature in container 10. Once the temperature within container 10 is reduced to below the predetermined temperature, control 22 again acts through relay 23 to couple the power source to a dummy load 24 and cut off flow of electricity from the source to wafers 13 to halt further refrigeration of the detector unit.

A doughnut-shaped vessel 17 partially filled with water 18, arranged below plate 14 and surrounding the upper end of photomultiplier tube 11, is preferably employed to improve stability and more evenly distribute the temperature adjacent the detector unit.

As the thermoelectric units remove heat from inside container 10, the temperature of the water in doughnut-shaped vessel 17 decreases until freezing takes place. A self-balancing condition is then set up in which the temperature inside vessel 17 and plate 14 cannot drop below 32° F. as long as some of the water remains unfrozen.

Heat generated at plate 15 can be dissipated into the air through radiators 20 or into the main chassis of the logging instrument by means of straps 19.

Tubular housing 21, used to carry electrical leads 32 into container 10, is preferably fabricated from low thermal conductor material such as stainless steel.

It can be easily recognized that this unique method of providing refrigeration for a photomultiplier and crystal in a well logging instrument saves preparation time at the well site and eliminates the operating time limitation of surface refrigerated instruments. In addition, a saving is made in that no refrigerating agent or devices need be borne to the well site.

Having fully described the nature, method, objects, and apparatus of our invention, we claim:

1. Apparatus for maintaining the temperature of a radiation detector unit at a constant low level during logging operations comprising:
    an insulated enclosure;
    a radiation detector unit for use in well logging arranged in said enclosure;
    thermoelectric cooling means arranged in said enclosure adjacent said radiation detector unit;
    a temperature control system adapted to maintain the temperature within said enclosure substantially constant by supplying electrical energy to said thermoelectric cooling means when said temperature rises above said low temperature level; and
    heat sink means positioned within said enclosure including a container partially filled with freezable medium adapted to be partially frozen surrounding a portion of said detector unit.

2. Apparatus for maintaining the temperature of a radiation detector unit at a constant low level during logging operations comprising:
    an insulated enclosure;
    a radiation detector unit for use in well logging arranged in said enclosure;
    thermoelectric cooling means arranged in said enclosure adjacent said radiation detector unit;
    a temperature control system adapted to maintain the temperature within said enclosure substantially constant by supplying electrical energy to said thermoelectric cooling means when said temperature rises above said low temperature level;
    heat sink means positioned within said enclosure including a container partially filled with water surrounding a portion of said detector unit;
    means adjacent said detector unit and said thermoelectric cooling means for conducting heat from said detector unit to said thermoelectric cooling means; and
    means adjacent said thermoelectric cooling means for conducting heat from said thermoelectric cooling means.

3. Apparatus as recited in claim 2 in which said means for conducting heat from said conductor unit to said thermoelectric cooling means comprises spaced-apart fins surrounding said detector unit; and said means for conducting heat from said thermoelectric cooling means comprises radiators mounted on said thermoelectric cooling means.

4. Apparatus as recited in claim 3 in which said heat sink means is doughnut shaped.

5. A method for maintaining the temperature of a radiation detector unit at a substantially constant low level during well logging operations comprising surveying a well with said detector unit while controllably refrigerating said detector unit by supplying electrical energy to a thermoelectric device arranged adjacent said detector unit in response to temperature increases above said low temperature level and by employing a heat sink containing a freezable medium and surrounding said detector unit whereby said temperature is maintained at a level such that some but not all of the freezable medium contained in said heat sink is frozen.

References Cited by the Examiner
UNITED STATES PATENTS

| | | | |
|---|---|---|---|
| 1,818,221 | 8/31 | Huber | 62—3 |
| 2,711,084 | 6/55 | Bergan | 62—259 |
| 2,714,169 | 7/55 | Armistead | 250—71 |
| 2,777,975 | 1/57 | Aigran | 62—3 |
| 2,824,233 | 2/58 | Herzog | 62—259 |
| 2,922,284 | 6/60 | Danielson | 62—3 |
| 2,952,786 | 9/60 | Lewis | 62—3 |
| 2,994,203 | 8/61 | Lackey | 62—3 |
| 3,064,440 | 11/62 | Waller | 62—259 |
| 3,077,079 | 2/63 | Pietsch | 62—3 |
| 3,127,749 | 4/64 | Bergvall | 62—3 |

WILLIAM J. WYE, *Primary Examiner.*

ROBERT A. O'LEARY, *Examiner.*